June 7, 1966 K. EULER 3,255,449

CIRCUIT ARRANGEMENT FOR CONVERTING AN ANALOG VALUE INTO AN N-PLACE BINARY NUMBER

Filed Jan. 23, 1962 2 Sheets-Sheet 1

United States Patent Office 3,255,449
Patented June 7, 1966

3,255,449
CIRCUIT ARRANGEMENT FOR CONVERTING AN ANALOG VALUE INTO AN N-PLACE BINARY NUMBER

Karl Euler, Munich, Germany, assignor to Siemens & Halske Aktiengesellschaft, Berlin and Munich, Germany, a corporation of Germany Filed Jan. 23, 1962, Ser. No. 168,084
Claims priority, application Germany, Feb. 17, 1961, 72,588
4 Claims. (Cl. 340—347)

The invention disclosed herein is concerned with a circuit arrangement for converting an analog value into an *n*-place binary number, the individual places of which are ascertained by step-by-step comparison of the analog value with ½, ¼, ⅛ . . . of the maximum amplitude value.

In a known circuit arrangement of this kind, the analog value which is to be converted is stored in a capacitor and is successively compared with ½, ¼, ⅛ of a voltage corresponding to the maximum amplitude value. The first place of the binary number is marked as "1" when the analog value which is to be converted exceeds one-half of the maximum voltage, and this voltage is subtracted from the voltage stored in the capacitor. The residual voltage at the capacitor is thereupon compared with ¼ of the maximum voltage. If the residual voltage does not exceed this voltage value, the second place of the binary number is marked as "0" and nothing is subtracted from the residual voltage at the capacitor. The operations are similar in connection with the remaining comparison steps.

The drawback of this circuit arrangement is that the comparison voltage which is to be compared with the analog voltage is composed of a plurality of serially connected voltages, coming from a plurality of stages, which voltages must not have a common ground potential. This produces difficulties which can be overcome only by increased expenditures.

The circuit arrangement according to the present invention avoids these disadvantages by the provision of a current dependent resistor with flip properties (flip resistor) over which is conducted an analog current corresponding to the analog value, such flip resistor being by means of a first bias resistor adjusted so that its current maximum lies at the value 0 of the analog current, current from the stages, with —½, —¼, —⅛ . . . of analog current corresponding to the maximum amplitude, being conducted to the flip resistor over *n*-parallel switches which are successively triggered in pass direction, the last of these switches always remaining conductive or being blocked, respectively, whereby the appropriate binary place is determined when the analog current respectively exceeds or remains below the sum of the currents of the stages which had been switched in. Accordingly, the analog value is converted into an analog current and not into an analog voltage as was the case in the previously known arrangement.

A tunnel diode is in an advantageous embodiment used as a flip resistor. To each place of the binary number is assigned a bistable storage member which is, upon the beginning of the corresponding comparison step, switched into the "1-position," thereby making the cooperatively related switch conductive. The voltage yielded in given cases at the tunnel diode is conducted to a special amplifier which gives off a voltage at its output, to switch the involved storage member again into the 0-position, only when the analog current is lower than the sum of the currents of the stages, thus producing at the tunnel diode a relatively low voltage. Upon conclusion of the conversion operation, the conditions of the storage stages will accordingly correspond to the various places of the binary number.

The times or instants required for the conversion are advantageously derived from a timing distributor.

Further details of the present invention will appear from the description which is rendered below with reference to the accompanying drawings.

Figure 1:
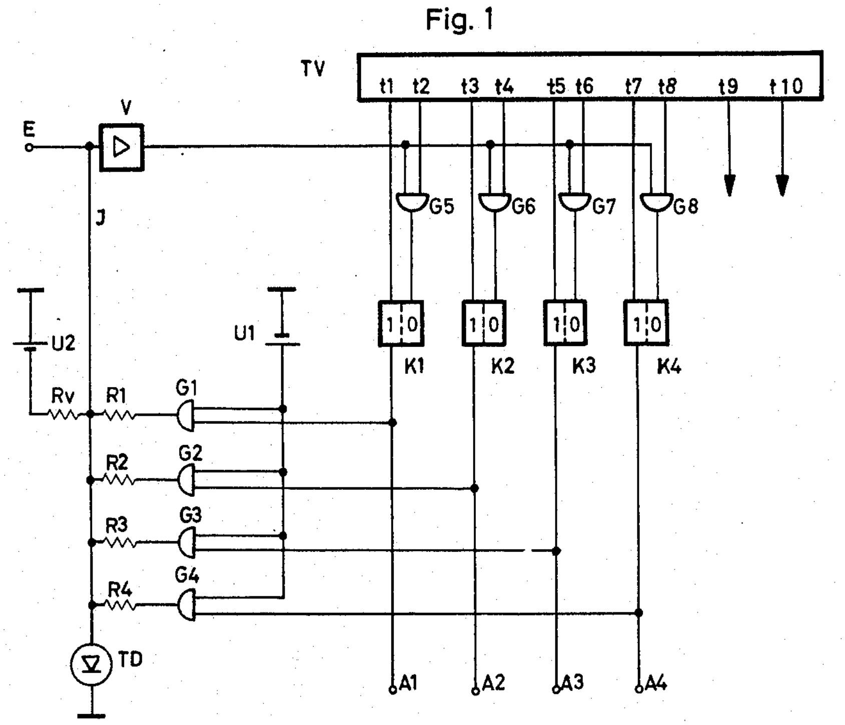
FIG. 1 shows an example of an embodiment of the invention, comprising a special amplifier and a timing distributor adapted to deliver a given number of timing signals or impulses.
Figure 2:
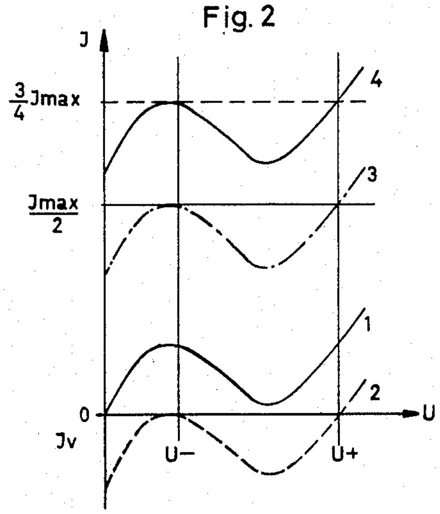
FIG. 2 represents curves to be considered in connection with the tunnel diode.

In FIG. 2, the curve 1 is the characteristic curve of the tunnel diode TD of FIG. 1, without bias voltage. The current from the voltage source U2 (FIG. 1), conducted over the resistor R*v*, shifts the characteristic curve of the tunnel diode TD downwardly so far (curve 2 in FIG. 2) that the current maximum lies at a voltage U— exactly at the position of the current $J=0$.

To the input E (FIG. 1) is conducted an analog current corresponding to the analog value which is to be converted. The timing distributor TV delivers at the timing instant *t*1 an impulse which switches the bistable flip stage K1 into the "1"-position, thus triggering the coincidence gate G1 so as to make it conductive. A current flow is thereby developed extending from the voltage source U1 over the coincidence gate G1, resistor R1, to the tunnel diode TD. The resistor R1 is so dimensioned that the current in this circuit is equal to one-half of the analog current Jmax which corresponds to the maximum amplitude value. As will be seen from FIG. 2, curve 3 applies now, owing to the second bias current *J*max/2 and at the tunnel diode TD will appear a voltage which exceeds U+, this being the case when the analog current conducted to the input E (FIG. 1) is higher than the current flowing over the resistor R1. Accordingly, at the input of the special amplifier V will appear a comparatively high voltage. This special amplifier is so constructed that a voltage will appear at its output only when its input voltage is higher than or equal to U+. This is the case when the analog current J is higher than *J*max/2. Accordingly, the impulse given off from the timing distributor TV at the timing instant *t*2 cannot run through the coincidence gate G5 and the bistable flip stage K1 remains in the "1"-position, thus marking the first place of the binary number as a "1." The coincidence gate G1 remains conductive and the current determined by the resistor R1 continues to flow through the tunnel diode TD.

An impulse is released by the timing distributor at the timing instant *t*3, causing the bistable flip stage K2 to switch into the "1" position, thereby triggering the coincidence gate G2. A further current flow is thus developed extending from the voltage source U1 over the coincidence gate G2, resistor R2 and the tunnel diode TD. The resistor R2 is so dimensioned that this further current is equal to *J*max/4. It shall be assumed that the analog current which is to be converted lies between *J*max/2 and *J*max/2+*J*max/4.

As will be seen from FIG. 2 (curve 4), there will now be a voltage at the tunnel diode TD, which is lower than U—, such voltage lying at the input of the special amplifier V. Accordingly, at the output of such amplifier will appear a voltage which is effective to prepare the operative actuation of the coincidence gates G5 to G8. The following timing pulse *t*4 of the timing distributor TV can accordingly run through the coincidence gate G6, thus restoring the bistable flip stage K2 to the "0"-position. The second place of the binary number is thereby marked as "0"; the coincidence gate G2 is moreover blocked again, whereby the current flow Jmax/4 over the resistor R2 is discontinued.

The further places of the binary number are ascertained in similar manner with the aid of the bistable flip stages K3 and K4, coincidence gates G3 and G4, resistors R3 and R4 and coincidence gates G7 and G8. The resistors R3 and R4 are so dimensioned that the auxiliary current flow which is thereby determined, is equal to Jmax/8 and Jmax/16, respectively.

Accordingly, the conditions of the bistable flip stages K1 to K4 will at the conclusion of the conversion operation correspond to the various places of the binary number. The conditions of these flip stages are read out at the timing instant *t*9 so as to obtain at the outputs A1 to A4 the binary number in parallel representation. All flip stages are restored to the "0"-position at the timing instant *t*10. The arrangement is then again in its initial position.

Figure 3:
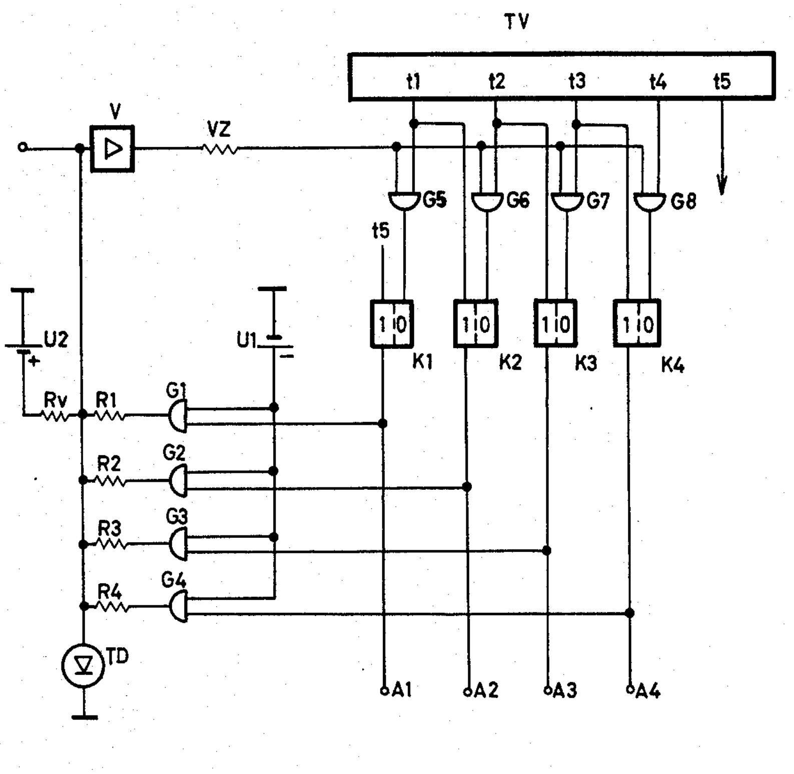
FIG. 3 is another embodiment of the invention which differs from the one shown in FIG. 1 merely by the provision of a timing distributor which delivers fewer timing signals and having a delay member in the circuit extending from the special amplifier.

The embodiment shown in FIG. 3 differs from the one explained with reference to FIG. 1 merely by the provision of a timing distributor TV which supplies only half as many timing instants or impulses, a further distinction residing in the use of a delay member VZ which is serially disposed with respect to the special amplifier V. Such delay member is operative to delay the output voltages of the special amplifier by one timing interval. A timing pulse given off by the timing distributor TV effects the switching over of a bistable flip stage into the "1"-position and simultaneously, in a given case, the restoration of the preceding flip stage into the "0"-position. For example, the timing pulse *t*2 switches the bistable flip stage K3 into the "1"-position, and simultaneously effects restoration of the bistable flip stage K2 into the "0"-position, such operation occurring in a case in which the coincidence gate G6 has been prepared by the output voltage of the amplifier V over the delay member VZ. The timing pulse *t*5 effects readout of the flip stages K1 to K4 and restoration thereof into the "0"-position. The timing pulse *t*5 also switches the flip stage K1 into the "1"-position, thus preparing for the next following conversion operation.

The described conversion circuits utilize the property of tunnel diodes to operate with very low power level. Experiments have shown that it suffices to represent an amplitude stage by approximately 0.25 mA. The converter with 16 amplitude stages, shown respectively in FIGS. 1 and 3, requires only 4 mA., impressed current. Moreover, it is possible to use, in the converters herein disclosed, so called "poor" tunnel diodes which exhibit, for example, a ratio of current maximum to current minimum, of only 2:1. The high limit frequency of tunnel diodes makes it possible to construct very rapidly operating converters.

Changes may be made within the scope and spirit of the appended claims which define what is believed to be new and desired to have protected by Letters Patent.

I claim:

1. A circuit arrangement for converting an analog value, represented by a corresponding analog current, into an *n*-place binary number, the individual places of which are determined by comparing the analog value with ½, ¼, ⅛ . . . of the maximum amplitude value, comprising a number of bistable storage members corresponding to the digits of the binary number, a timing distributor operatively connected to said storage members operative to shift the latter, one after the other, into a "1"-position, an amplifier operatively connected to said storage members, means including a plurality of resistances operatively connected to the input of said amplifier and the respective storage members, and constructed to supply current in the ratios of ½, ¼, ⅛ . . . of the analog current corresponding to the maximum analog value, said amplifier being operative to deliver at its output a signal operative to reset the corresponding storage member into an "0"-position only when the analog current is smaller than the sum of the currents delivered from said resistances, a tunnel diode operatively connected to the junction of said amplifier input and said resistances, and biasing means operatively connected to said tunnel diode, and so baising the latter that its current maximum exists at the zero analog value, whereby a relatively high voltage will exist at said tunnel diode when the analog current is less than the sum of currents conducted over said resistances, and a relatively high voltage when the analog current is greater than the sum of such currents.

2. A circuit arrangement according to claim 1, wherein the connections between said storage members and said timing distributor are such that each storage member is switched into the "1"-position by a first timing pulse and in a given case restored to the "0"-position by the next following timing pulse.

3. A circuit arrangement according to claim 1, wherein the connection between said storage members and said timing distributor are such that a storage member is by one timing pulse switched into the "1"-position while the preceding storage member is in a given case switched back into the "0"-position.

4. A circuit arrangement according to claim 3, comprising a delay member connected in series relation with said amplifier, said delay member producing a delay amounting to one timing interval.

References Cited by the Examiner

UNITED STATES PATENTS

| | | | |
|---|---|---|---|
| 2,974,315 | 3/1961 | Lebel et al. | 340—347 |
| 3,021,517 | 2/1962 | Kaenel | 340—347 |
| 3,056,049 | 9/1962 | Baird | 307—88.5 |
| 3,062,971 | 11/1962 | Wallace | 307—88.5 |

OTHER REFERENCES

Shevel: Digital to Analog Converter, IBM Technical Disclosure Bulletin, vol. 2, No. 5, p. 101, February 1960.

MALCOLM A. MORRISON, *Primary Examiner.*

D. M. ROSEN, W. J. KOPACZ, *Assistant Examiners.*